United States Patent
Dettinger et al.

(10) Patent No.: US 9,031,924 B2
(45) Date of Patent: May 12, 2015

(54) QUERY CONDITIONS HAVING FILTERED FIELDS WITHIN A DATA ABSTRACTION ENVIRONMENT

(75) Inventors: Richard D. Dettinger, Rochester, MN (US); Janice R. Glowacki, Rochester, MN (US); Frederick A. Kulack, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1067 days.

(21) Appl. No.: 12/204,250

(22) Filed: Sep. 4, 2008

(65) Prior Publication Data

US 2008/0319969 A1 Dec. 25, 2008

Related U.S. Application Data

(63) Continuation-in-part of application No. 11/226,181, filed on Sep. 14, 2005, now Pat. No. 8,180,787, which is a continuation of application No. 10/083,075, filed on Feb. 26, 2002, now Pat. No. 6,996,558.

(51) Int. Cl.
*G06F 7/00* (2006.01)
*G06F 17/30* (2006.01)

(52) U.S. Cl.
CPC .... *G06F 17/30392* (2013.01); *G06F 17/30398* (2013.01)

(58) Field of Classification Search
None
See application file for complete search history.

(56) References Cited

U.S. PATENT DOCUMENTS

| | | | | |
|---|---|---|---|---|
| 4,873,625 A | * | 10/1989 | Archer et al. | 707/752 |
| 5,253,362 A | | 10/1993 | Nolan et al. | |
| 5,584,024 A | * | 12/1996 | Shwartz | 1/1 |
| 5,630,121 A | | 5/1997 | Braden-Harder et al. | |
| 5,734,887 A | | 3/1998 | Kingberg et al. | |
| 5,842,212 A | * | 11/1998 | Ballurio et al. | 1/1 |
| 5,873,079 A | * | 2/1999 | Davis et al. | 1/1 |
| 5,884,304 A | * | 3/1999 | Davis et al. | 1/1 |
| 6,009,422 A | | 12/1999 | Ciccarelli | |
| 6,233,586 B1 | | 5/2001 | Chang et al. | |
| 6,275,819 B1 | | 8/2001 | Carter | |
| 6,353,830 B1 | * | 3/2002 | Yee et al. | 1/1 |
| 6,457,009 B1 | | 9/2002 | Bollay | |
| 6,460,043 B1 | | 10/2002 | Tabbara et al. | |
| 6,507,833 B1 | * | 1/2003 | Hichwa et al. | 707/702 |
| 6,553,368 B2 | | 4/2003 | Martin et al. | |
| 6,601,065 B1 | | 7/2003 | Nelson et al. | |
| 6,711,565 B1 | | 3/2004 | Subramaniam et al. | |
| 6,725,227 B1 | | 4/2004 | Li | |
| 6,728,702 B1 | | 4/2004 | Subramaniam et al. | |

(Continued)

OTHER PUBLICATIONS

Roger Jennings, Special Edition Using Microsoft® Access 2000 (1999), published by Que Corporation.*

(Continued)

*Primary Examiner* — Khanh Pham
*Assistant Examiner* — Eliyah S Harper
(74) *Attorney, Agent, or Firm* — Patterson & Sheridan, LLP

(57) ABSTRACT

Embodiments of the invention provide techniques for composing and executing queries using filtered fields. In one embodiment, a query may be composed with compatible fields, meaning filtered fields that store related data of a particular data type. Such compatible fields may be combined into a single query condition, thus simplifying the composition and execution of the query. In one embodiment, fields may be identified as compatible based on metadata included in a database abstraction model.

20 Claims, 11 Drawing Sheets

(56) References Cited

U.S. PATENT DOCUMENTS

| | | | |
|---|---|---|---|
| 6,763,351 | B1 | 7/2004 | Subramaniam et al. |
| 6,782,383 | B2 | 8/2004 | Subramaniam et al. |
| 6,803,927 | B1 | 10/2004 | Sahoo |
| 6,820,076 | B2 | 11/2004 | Bailey et al. |
| 6,850,974 | B2 * | 2/2005 | Schweitzer et al. .......... 709/223 |
| 6,928,431 | B2 | 8/2005 | Dettinger et al. |
| 6,950,988 | B1 * | 9/2005 | Hawkins et al. .............. 715/700 |
| 6,954,748 | B2 | 10/2005 | Dettinger et al. |
| 6,996,558 | B2 * | 2/2006 | Dettinger et al. ..................... 1/1 |
| 7,092,559 | B2 * | 8/2006 | Soussaline et al. ........... 382/133 |
| 7,096,229 | B2 | 8/2006 | Dettinger et al. |
| 7,203,688 | B2 * | 4/2007 | Hopkins .............................. 1/1 |
| 7,213,013 | B1 | 5/2007 | Subramaniam et al. |
| 7,293,014 | B2 | 11/2007 | Subramaniam et al. |
| 7,330,807 | B2 * | 2/2008 | Koehler et al. ................... 703/7 |
| 7,464,072 | B1 | 12/2008 | Subramaniam et al. |
| 7,505,958 | B2 | 3/2009 | Dettinger et al. |
| 7,546,287 | B2 | 6/2009 | Subramaniam et al. |
| 7,805,465 | B2 | 9/2010 | Dettinger et al. |
| 7,925,672 | B2 | 4/2011 | Dettinger et al. |
| 2002/0078068 | A1 | 6/2002 | Krishnaprasad et al. |
| 2003/0061207 | A1 * | 3/2003 | Spektor ............................. 707/3 |
| 2003/0088545 | A1 | 5/2003 | Subramaniam et al. |
| 2003/0105978 | A1 * | 6/2003 | Byrne ............................ 713/201 |
| 2003/0172056 | A1 | 9/2003 | Dettinger et al. |
| 2003/0220893 | A1 | 11/2003 | Dettinger et al. |
| 2006/0010127 | A1 * | 1/2006 | Dettinger et al. ................. 707/4 |
| 2006/0074953 | A1 | 4/2006 | Dettinger et al. |
| 2008/0033976 | A1 | 2/2008 | Dettinger et al. |
| 2009/0144251 | A1 | 6/2009 | Dettinger et al. |

OTHER PUBLICATIONS

Roger Jennings, Special Edition Using Microsoft® Access 2000 (1999), published by Que Corporation, pp. xxviii, 2, 25, 204-205, 286, 320-330, 333-374, 814, 850, 856, 863-864, 876, 939, 1044.*

Roger Jennings, Special Edition Using Microsoft Access 2000 (1999), published by Que Corporation.*

Calmet, Jacques et al., A generic query-translation framework for a mediator architecture, Proceedings of the Thirteenth International Conference on Data Engineering, 1997, pp. 434-443, IEEE Computer Society, Washington, D.C., United States.

U.S. Patent Application entitled "Processing Query Conditions Having Filtered Fields Within a Data Abstraction Environment" by Richard D. Dettinger et al.

Llama, "Search Code: Search Your Database," <http://www.codewalkers.com/c/a/Search-Code/Search-Your-Database/>, retrieved Mar. 23, 2009, pp. 1-4.

Meng et al., "A Theory of Translation From Relational Queries to Hierarchical Queries," *IEEE Transactions on Knowledge and Data Engineering*, Apr. 1995, vol. 7(2): pp. 228-245.

Office Action History for U.S. Appl. No. 10/083,075 from Nov. 26, 2004 to Sep. 1, 2005.

Office Action History for U.S. Appl. No. 11/226,181 from Mar. 25, 2009 to Aug. 10, 2010.

* cited by examiner

| | | |
|---|---|---|
| | DATABASE ABSTRACTION MODEL | — 148 |
| | LOGICAL FIELDS | — 208 |
| 210₁ — 212₁ — | Field<br>Name = "FirstName"<br>Access Method = "Simple"<br>Table = "Demographics"<br>Column = "f_name" | — 208₁ |
| 210₂ — 212₂ — | Field<br>Name = "LastName"<br>Access Method = "Simple"<br>Table = "Demographics"<br>Column = "l_name" | — 208₂ |
| 210₃ — 212₃ — | Field<br>Name = "Hemoglobin_Test"<br>Access Method = "Filtered"<br>Table = "Test"<br>Name Column = "Test_ID"<br>Value Column = "Test_Results"<br>Filter = "1234" | — 208₃ |
| 210₄ — 212₄ — | Field<br>Name = "Age"<br>Access Method = "Composed"<br>Composition = "Currentdate-Birthdate" | — 208₄ |
| 210₅ — 212₅ — | Field<br>Name = "Hemoglobin_Test_2"<br>Access Method = "Filtered"<br>Table = "Tests"<br>Name Column = "Test_ID"<br>Value Column = "Test_Results"<br>Filter = "1221" | — 208₅ |

FIG. 2B

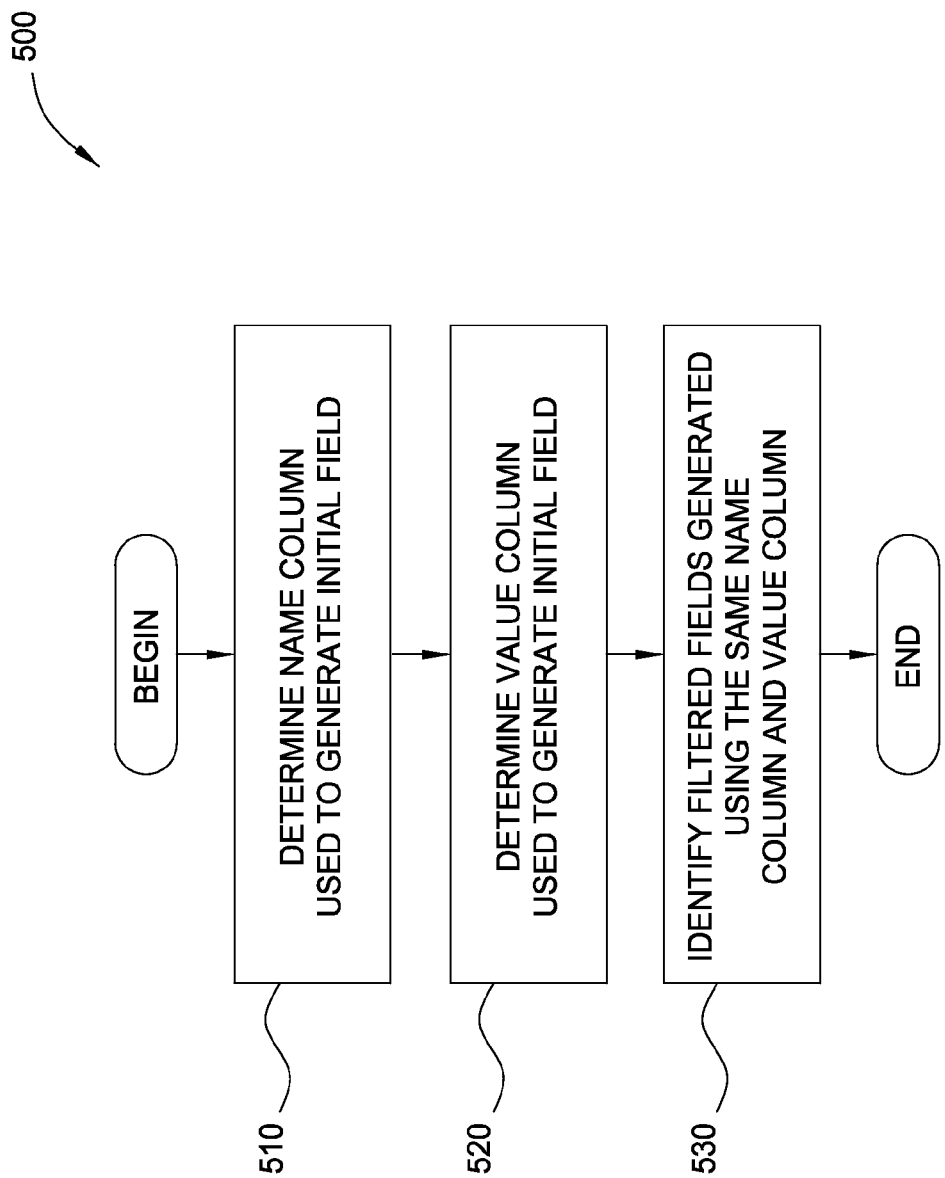

QUERY RESULTS

| PATIENT | TEST | VALUE |
|---|---|---|
| 5006 | Y | 2.0 |
| 5002 | Y | 2.7 |
| 5010 | X | 1.4 |
| 5010 | Z | 0.5 |
| 5023 | Z | 1.9 |
| 5023 | X | 2.5 |
| 5041 | X | 1.1 |
| 5057 | Y | 0.8 |

FIG. 6C

QUERY CONDITIONS HAVING FILTERED FIELDS WITHIN A DATA ABSTRACTION ENVIRONMENT

CROSS-REFERENCE TO RELATED APPLICATIONS

This application is a continuation-in-part of U.S. patent application Ser. No. 11/226,181, filed Sep. 14, 2005 now U.S. Pat. No. 8,180,787, which is a continuation of U.S. application Ser. No. 10/083,075, filed Feb. 26, 2002 now U.S. Pat. No. 6,996,558. The aforementioned patent is herein incorporated by reference in its entirety.

BACKGROUND OF THE INVENTION

1. Field of the Invention

The invention generally relates to computer database systems. More particularly, the invention relates to techniques for processing query conditions having filtered fields within a data abstraction environment.

2. Description of the Related Art

Databases are well known systems for storing, searching, and retrieving information stored in a computer. The most prevalent type of database used today is the relational database, which stores data using a set of tables that may be reorganized and accessed in a number of different ways. Users access information in relational databases using a relational database management system (DBMS). Queries of a relational database may specify which data items should be retrieved, how to join various data items, and conditions (predicates) that must be satisfied for a particular data item to be included in a query result table.

The complexity of constructing a query statement, however, generally makes it difficult for average users to compose queries of a relational database. Because of this complexity, users often turn to database query applications to assist them in composing queries of a database. One technique for managing the complexity of a relational database, and the SQL query language, is to use a database abstraction model. Generally, a database abstraction model is constructed from logical fields that map to data stored in the underlying physical database.

SUMMARY OF THE INVENTION

One embodiment of the invention provides a computer-implemented method, comprising: receiving an abstract query including an abstract query condition comprising a plurality of logical fields, wherein the abstract query is composed using a set of logical fields defined in an abstraction model that models underlying physical data in a manner making a schema of the physical data transparent to a user of the abstraction model. The method further comprises, upon determining that all of the plurality of logical fields are defined on the basis of the same name column and the same value column of the underlying physical data: based on the abstraction model, transforming the abstract query to generate an executable query, wherein the abstract query condition is reflected in a single sub-query of the executable query; and executing the executable query to produce a set of query results.

Another embodiment of the invention provides a computer readable storage medium containing a program which, when executed, performs an operation, comprising: receiving an abstract query including an abstract query condition comprising a plurality of logical fields, wherein the abstract query is composed using a set of logical fields defined in an abstraction model that models underlying physical data in a manner making a schema of the physical data transparent to a user of the abstraction model. The operation further comprises, upon determining that all of the plurality of logical fields are defined on the basis of the same name column and the same value column of the underlying physical data: based on the abstraction model, transforming the abstract query to generate an executable query, wherein the abstract query condition is reflected in a single sub-query of the executable query; and executing the executable query to produce a set of query results.

Yet another embodiment of the invention includes a system, comprising: a database; a processor; and a memory containing a program. When executed by the processor, the program is configured to perform an operation, comprising: receiving an abstract query including an abstract query condition comprising a plurality of logical fields, wherein the abstract query is composed using a set of logical fields defined in an abstraction model that models underlying physical data in a manner making a schema of the physical data transparent to a user of the abstraction model. The operation further comprises, upon determining that all of the plurality of logical fields are defined on the basis of the same name column and the same value column of the underlying physical data: based on the abstraction model, transforming the abstract query to generate an executable query, wherein the abstract query condition is reflected in a single sub-query of the executable query; and executing the executable query to produce a set of query results.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIGS. 2A-2C illustrate logical views of a database abstraction model constructed over an underlying physical database, according to one embodiment of the invention.

FIGS. 5A-5B illustrate a method for determining filtered fields compatible with an initial field included in a query condition, according to one embodiment of the invention.

FIGS. 6A-6C illustrate a graphical user interface of a query application configured for composing abstract queries including multiple compatible fields, according to one embodiment of the invention.

DETAILED DESCRIPTION OF THE PREFERRED EMBODIMENTS

Figure 1:
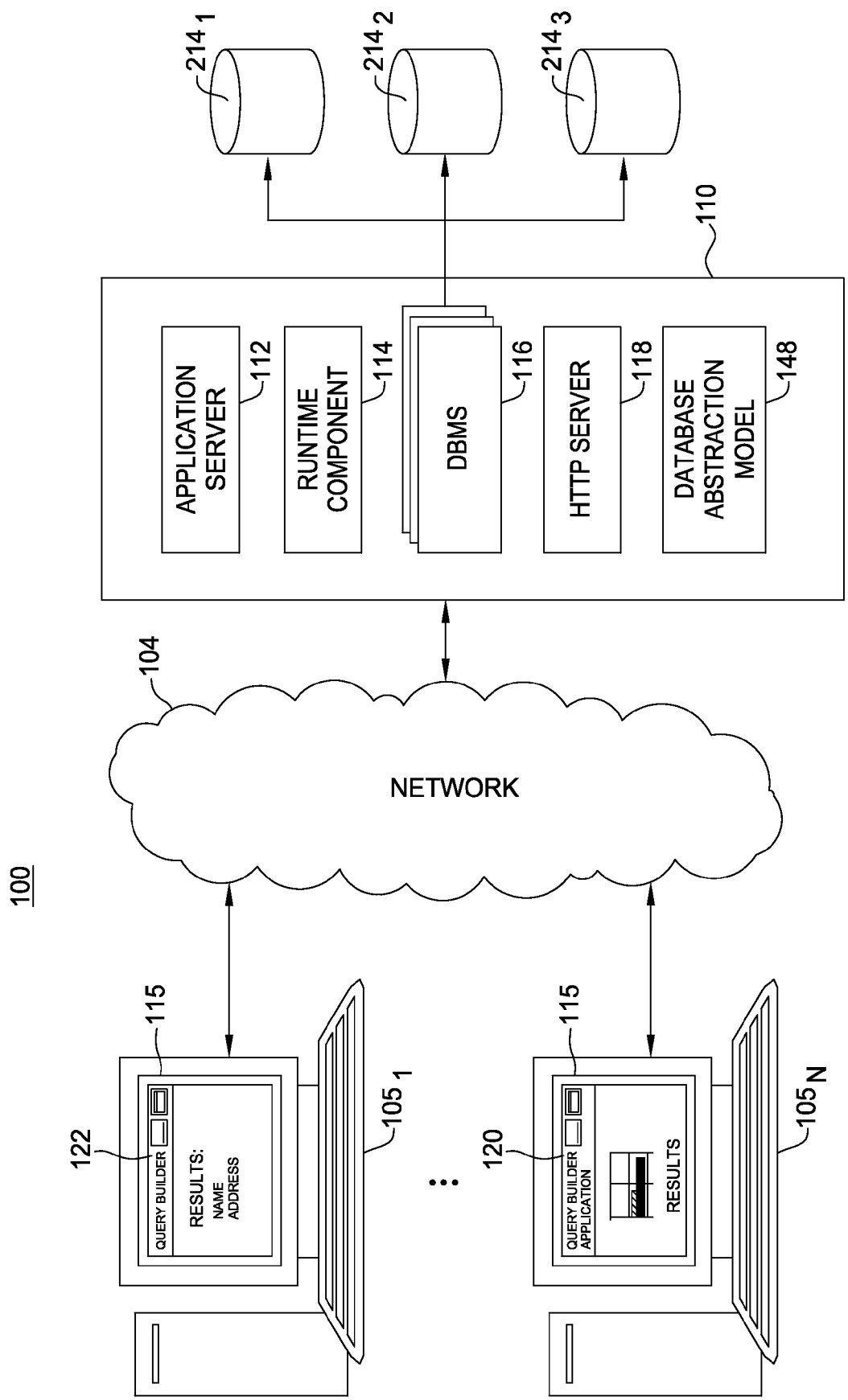
FIG. 1 is a block diagram illustrating a network environment, according to one embodiment of the invention.

A database abstraction model is constructed from logical fields that map to data stored in the underlying physical database. Each logical field defines an access method that specifies a location (i.e., a table and column) in the underlying database from which to retrieve data. Users compose an abstract query by selecting logical fields and specifying conditions. Data is retrieved from the physical database by generating a resolved query (e.g., an SQL statement) from the abstract query. Because the database abstraction model is tied to neither the syntax nor the semantics of the physical database, additional capabilities may be provided by the database abstraction model without having to modify the underlying database.

A database abstraction model may include filtered fields, meaning multiple logical fields that are stored together in a smaller number of physical database columns. For example, a first column of a database may include the names of various medical tests, and a second column may include result values corresponding to the multiple medical tests. The result values for a particular test may be retrieved by filtering the column by the name of the desired test. Filtered fields may be useful, for example, in applications requiring the efficient storage of data within a database.

However, the use of filtered fields can increase the difficulty of composing and executing a query to retrieve data from the database. For example, assume a user of a medical database wishes to retrieve result values equal to "3.0" for multiple medical tests, and that the results of each test are stored in a different filtered field. In the prior art, in order to compose such a query, the user must compose separate query conditions for each filtered field, and will thus need to be familiar with the names of each filtered field. Further, when such a query is executed, the values from each filtered field would be represented in a separate result column. In many situations, such output would form a Cartesian product, meaning that the results include the various combinations of the query result values, and may have the same query result values duplicated in multiple rows. Such query results may make analysis of the data difficult.

Embodiments of the invention provide techniques for composing and executing queries using filtered fields. In one embodiment, a query may be composed with compatible fields, meaning filtered fields that store related data of a particular data type. Such compatible fields may be combined into a single query condition, thus simplifying the composition and execution of the query. In one embodiment, fields may be identified as compatible based on metadata included in a database abstraction model.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive and DVDs readable by a DVD player) on which information is permanently stored; and (ii) writable storage media (e.g., floppy disks within a diskette drive, a hard-disk drive or random-access memory) on which alterable information is stored. Such computer-readable storage media, when carrying computer-readable instructions that direct the functions of the present invention, are embodiments of the present invention. Other media include communications media through which information is conveyed to a computer, such as through a computer or telephone network, including wireless communications networks. The latter embodiment specifically includes transmitting information to/from the Internet and other networks. Such communications media, when carrying computer-readable instructions that direct the functions of the present invention, are embodiments of the present invention. Broadly, computer-readable storage media and communications media may be referred to herein as computer-readable media.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

FIG. 1 illustrates a network environment 100 using a client-server configuration. Client computer systems $105_{1-N}$ include an interface that enables network communications with other systems over network 104. The network 104 may be a local area network where both the client system 105 and server system 110 reside in the same general location, or may be network connections between geographically distributed systems, including network connections over the Internet. Client system 105 generally includes a central processing unit (CPU) connected by a bus to memory and storage (not shown). Each client system 105 is typically running an operating system configured to manage interaction between the computer hardware and the higher-level software applications running on the client system 105 (e.g., a Linux® distribution, a version of the Microsoft Windows® operating system IBM's AIX® or OS/400®, FreeBSD, and the like). ("Linux" is a registered trademark of Linus Torvalds in the United States and other countries.)

The server system 110 may include hardware components similar to those used by the client system 105. Accordingly, the server system 110 generally includes a CPU, a memory, and a storage device, coupled by a bus (not shown). The server system 110 is also running an operating system, (e.g., a Linux® distribution, Microsoft Windows®, IBM's OS/400® or AIX®, FreeBSD, and the like).

The network environment 100 illustrated in FIG. 1, however, is merely an example of one computing environment. Embodiments of the present invention may be implemented using other environments, regardless of whether the computer systems are complex multi-user computing systems, such as a cluster of individual computers connected by a high-speed network, single-user workstations, or network appliances lacking non-volatile storage. Further, the software applications illustrated in FIG. 1 and described herein may be implemented using computer software applications executing on existing computer systems, e.g., desktop computers, server computers, laptop computers, tablet computers, and the like. However, the software applications described herein are not limited to any currently existing computing environment or programming language, and may be adapted to take advantage of new computing systems as they become available.

In one embodiment, users interact with the server system 110 using a graphical user interface (GUI) provided by a user interface 115. In a particular embodiment, GUI content may comprise HTML documents (i.e., web-pages) rendered on a client computer system $105_1$ using web-browser 122. In such an embodiment, the server system 110 includes a Hypertext Transfer Protocol (HTTP) server 118 (e.g., a web server such as the open source Apache web-server program or IBM's Web Sphere® program) configured to respond to HTTP requests from the client system 105 and to transmit HTML documents to client system 105. The web-pages themselves may be static documents stored on server system 110 or generated dynamically using application server 112 interacting with web-server 118 to service HTTP requests. Alternatively, client application 120 may comprise a database front-end, or query application program running on client system $105_N$. The web-browser 122 and application 120 may be configured to allow a user to compose an abstract query, and to submit the query for processing.

As illustrated in FIG. 1, server system 110 may further include a runtime component 114, a database management system (DBMS) 116, and a database abstraction model 148. In one embodiment, these components may be provided using software applications executing on the server system 110. The DBMS 116 includes a software application configured to manage databases $214_{1-3}$. That is, the DBMS 116 communicates with the underlying physical database system, and manages the physical database environment behind the database abstraction model 148. Users interact with the user interface 115 to compose and submit an abstract query to the runtime component 114 for processing. In one embodiment, users compose an abstract query from the logical fields defined by the database abstraction model 148. Logical fields and access methods are described in greater detail below in reference to FIGS. 2A-2B.

In one embodiment, the runtime component 114 may be configured to receive an abstract query, and in response, to generate a "resolved" or "concrete" query that corresponds to the schema of underlying physical databases 214. For example, the runtime component 114 may be configured to generate one or more Structured Query Language (SQL) queries from an abstract query. The resolved queries generated by the runtime component 114 are supplied to DBMS 116 for execution. Additionally, the runtime component 114 may be configured to modify the resolved query with additional restrictions or conditions, based on the focus of the abstract query.

Figure 2A:
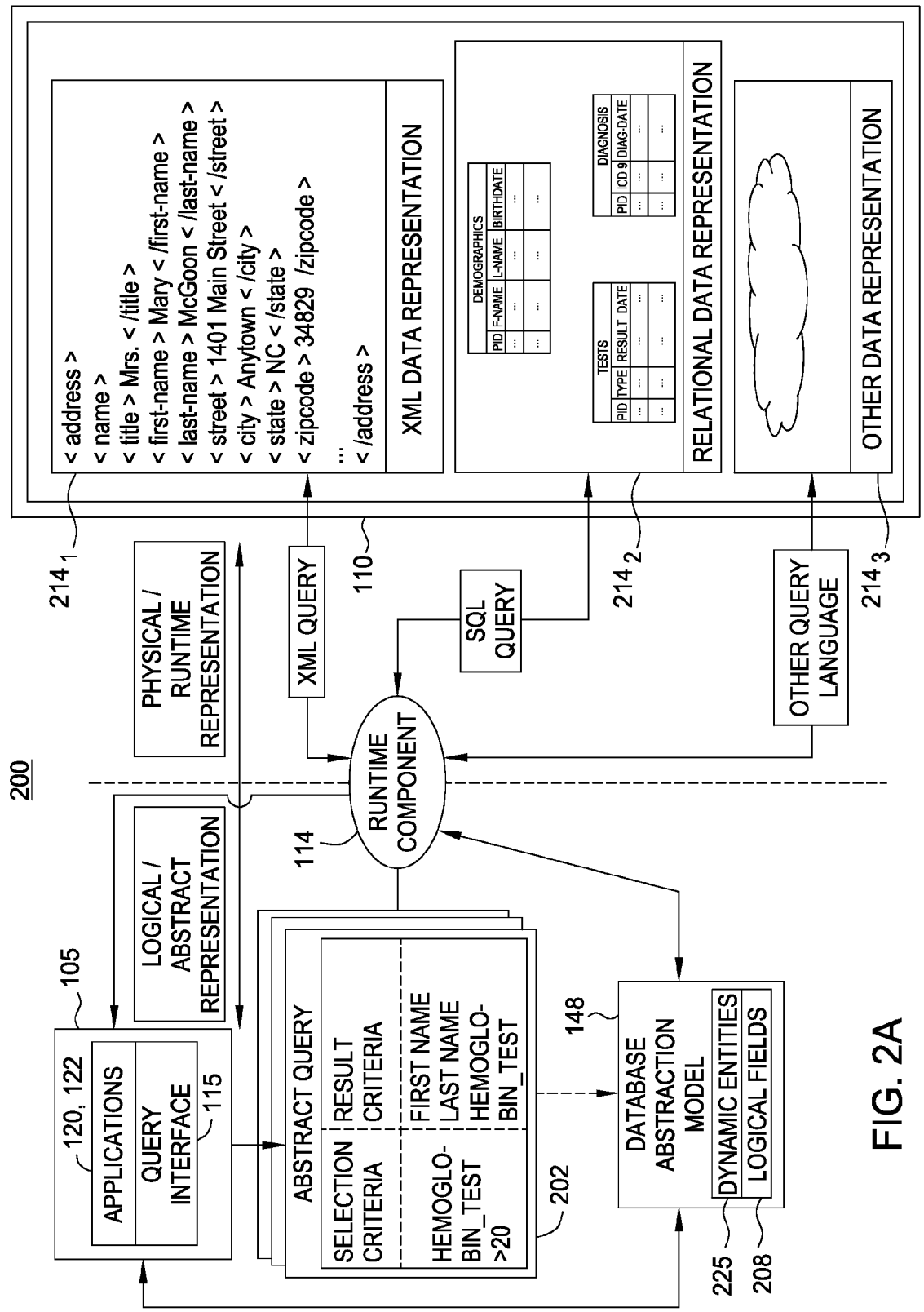

FIG. 2A illustrates a plurality of interrelated components of a database abstraction model, along with relationships between the logical view of data provided by the abstraction model environment (the left side of FIG. 2A), and the underlying physical database mechanisms used to store the data (the right side of FIG. 2A).

In one embodiment, users compose an abstract query 202 using the user interface 115. An abstract query 202 is generally referred to as "abstract" because it is composed using logical fields rather than direct references to data structures in the underlying physical databases 214. In one embodiment, the abstract query 202 is composed using logical fields 208 included in the database abstraction model 148. The logical fields 208 include specifications of access methods for mapping to a physical view of the data, including various underlying storage mechanisms. For example, for a given logical field, the runtime component may be generate an XML query that queries data from database $214_1$, an SQL query of relational database $214_2$, or other query composed according to another physical storage mechanism using "other" data representation $214_3$, or combinations thereof (whether currently known or later developed).

In one embodiment, the database abstraction model 148 may also define a dynamic entity 225 configured to generate logical fields for the database abstraction model 148. In one embodiment, dynamic entity 225 is executed when a user initiates a session for accessing the database 214 using the user interface 115. At that time, dynamic entity 225 may be configured to generate logical fields for the database abstraction model 148. An embodiment of a process for creating logical fields using a dynamic entity is described in more detail below with reference to FIG. 2C.

FIG. 2B illustrates an embodiment of the database abstraction model 148 that includes a plurality of logical field specifications $208_{1-5}$ (five shown by way of example). The access methods included in a given logical field specification 208 (or logical field, for short) provide a mapping for the logical field 208 to tables and columns in an underlying relational database (e.g., database $214_2$ shown in FIG. 2A). As illustrated, each field specification 208 identifies a logical field name $210_{1-5}$ and an associated access method $212_{1-5}$. Depending upon the different types of logical fields, any number of access methods may be supported by the database abstraction model 148. FIG. 2B illustrates access methods for simple fields, filtered fields, and composed fields. Each of these three access methods are described below.

A simple access method specifies a direct mapping to a particular entity in the underlying physical database. Field specifications $208_1$ and $208_2$ provide simple access methods $212_1$ and $212_2$, respectively. For a relational database, the simple access method maps a logical field to a specific database table and column. For example, the simple field access method $212_1$ shown in FIG. 2B maps the logical field name $210_1$ "FirstName" to a column named "f_name" in a table named "Demographics."

Field specification $208_4$ exemplifies a composed access method $212_4$. Composed access methods generate a return value by retrieving data from the underlying physical database and performing operations on the data. In this way, information that does not directly exist in the underlying data representation may be computed and provided to a requesting entity. For example, logical field access method $212_4$ illustrates a composed access method that maps the logical field "age" $208_4$ to another logical field named "birthdate." Assume that the logical field "birthdate" is defined in logical field specification (not shown) as mapping to a column in a demographics table of relational database $214_2$. In this example, data for the "age" logical field $208_4$ is computed by retrieving data from the underlying database using the "birthdate" logical field, and subtracting a current date value from the birth date value to calculate an age value returned for the logical field $208_4$. Another example includes a "name" logical filed (not shown) composed from the first name and last name logical fields $208_1$ and $208_2$.

Logical field specification $208_3$ exemplifies a filtered field access method $212_3$. Filtered access methods identify an associated physical database and provide rules defining a particular subset of items within the underlying database that should be returned for the filtered field. Consider, for example, a relational table storing test results for a plurality of different medical tests. Logical fields corresponding to each different test may be defined, and a filter for each different test is used to associate a specific test with a logical field. For example, logical field specification $208_3$ specifies a filtered field $210_3$ named "Hemoglobin_Test." The access method for filtered field $210_3$ maps to data stored in a "Tests" tests table. More specifically, the filtered field $210_3$ is specified in terms of a column storing the test names (i.e., Name Column="Test_ID"), a column storing test values (i.e., Value Column="Test_Results"), and a filter specifying a particular test name (i.e., Filter="1234"). Only data records that satisfy the filter (i.e., records having the value "1234" in the "Test_ID" column) are returned for this logical field. Accordingly, the filtered field $210_3$ returns a subset of data from a larger set, without the user having to know the specifics of how the data is represented in the underlying physical database, or having to specify the selection criteria as part of the query building process.

Logical field specification $208_5$ provides a second filtered field access method $212_5$. Note that logical field specification $208_5$ specifies a filtered field $210_5$ named "Hemoglobin_Test_2." Identically to the filtered field $210_3$ named "Hemoglobin_Test," the filtered field $210_5$ maps to data stored in a "Tests" tests table, and is specified in terms of a column storing the test names (i.e., Name Column="Test_ID") and a column storing test values (i.e., Value Column="Test_Results"). However, the filter for filtered field $210_5$ specifies a different test name (i.e., Filter="1221") than the filter for the filtered field $210_3$ (i.e., Filter="1234"). Thus, the filtered field "Hemoglobin_Test" and the filtered field "Hemoglobin_Test_2" are based on values stored in the same columns of the physical database. Generally, filtered fields based on values stored in the same columns of the physical database may be assumed to be compatible fields, meaning fields that store related data of a particular data type. In one embodiment, abstract queries may be composed with multiple compatible fields combined into a single query condition. The composition and execution of such abstract queries is described below with reference to FIGS. 4, 5, and 6A-6C.

By way of example, the field specifications 208 shown in FIG. 2B are representative of logical fields mapped to data represented in the relational data representation $214_2$. However, other instances of the data repository abstraction component 148 or, other logical field specifications, may map to other physical data representations (e.g., databases $214_1$ or $214_3$ illustrated in FIG. 2A). Further, in one embodiment, the database abstraction model 148 is stored on computer system 110 using an XML document that describes the logical fields, access methods, and additional metadata that, collectively, define the database abstraction model 148 for a particular physical database system. Other storage mechanisms or markup languages, however, are also contemplated.

Figure 2C:
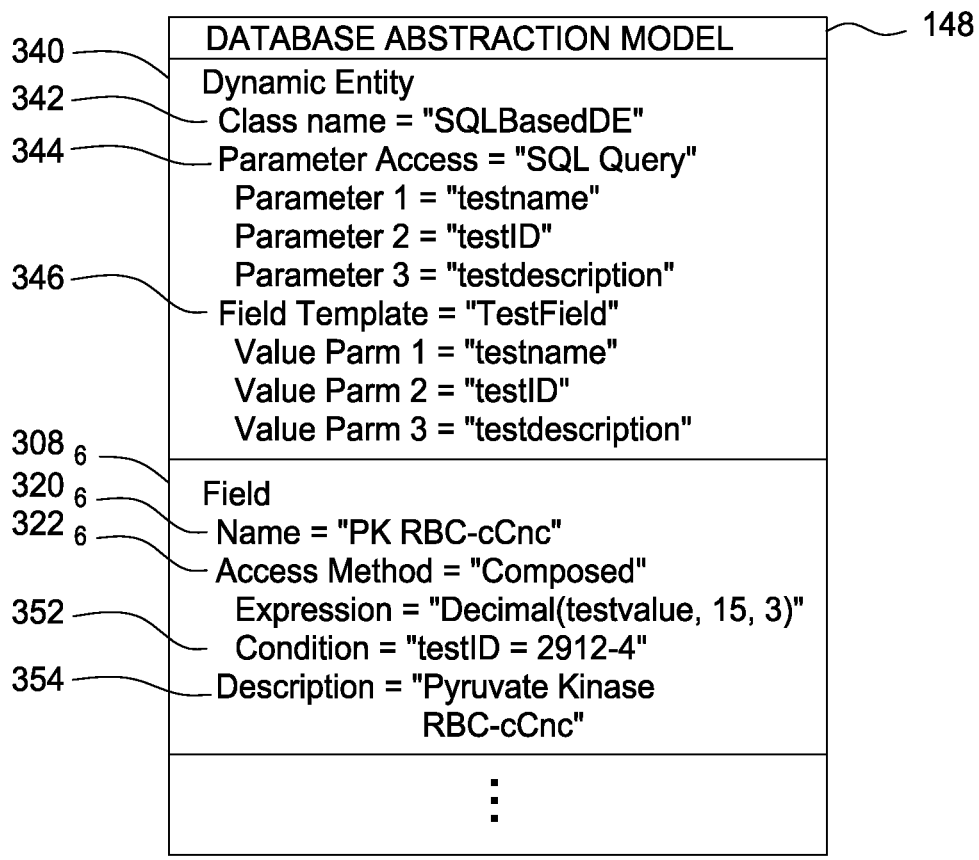

FIG. 2C illustrates an exemplary dynamic entity definition 340, according to one embodiment of the invention. In one embodiment, the database abstraction model 148 may includes one or more dynamic entity definitions 340, each defining a different dynamic entity 225 (shown in FIG. 2A). A dynamic entity definition 340 may specify a parameterized category, a field template, and a data request, such as an SQL or XML query. The parameterized field template can be used to generate logical field definitions in the database abstraction model 148 by supplying sets of parameter values. In one embodiment, a data request may be used to retrieve the parameter values from the database 214. Alternatively, a data request could parse a text file and pass each line of text as a separate set of parameters to a template.

As shown, the dynamic entity definition 340 may include an executable reference 342, representing a reference to executable code (e.g., a Java® class) or software program configured to generate the corresponding logical field definitions in the database abstraction model 148 from the field template. In this example, the executable reference 342 indicates that the dynamic entity definition 340 may be executed using a Java® class named "SQLBasedDE." The dynamic entity definition 340 also includes a data request specification 344. In this case, a SQL query (Parameter Access="SQL Query") is used to retrieve sets of parameter values supplied to a logical field template 346. Specifically, values for the parameters of "testname," "testID," and "testdescription" are supplied to template 346 in order to create a logical field. In this example, the "TestField" template defines the pattern for a logical fields generated using the "testname", "testID" and "testdescription" values (i.e., "Parm 1", "Parm 2" and "Parm 3").

As noted above, logical fields may be generated from dynamic entity definitions 340 when a database session is initiated. In other words, logical fields may be generated prior to displaying the database abstraction model 148 to a user. The logical fields generated from dynamic entity definitions 340 may be displayed to a user in the same manner as other logical fields 208 displayed on user interface 115. For example, the user interface 115 may provide a graphical representation of a hierarchal tree structure that corresponds to the logical fields 208 defined for the database abstraction model 148. The logical fields 208 can be selected by the user when creating abstract queries, such as the abstract query 202.

Assume that the logical field definition $308_6$ is generated by executing the Java® class "SQLBasedDE." That is, the dynamic entity definition 340 may be invoked by the runtime component 114 to generate logical fields using the logical field template 346. Accordingly, until the dynamic entity definition 340 is invoked, the logical field $308_6$ does not appear in the database abstraction model 148. By way of example, assume that "PK RBC-cCnc", "2912-4" and "Pyruvate Kinase RBC-cCnc" were retrieved as a set of parameter values from the database 214 for the template elements of "testname", "testID" and "testdescription", respectively. These values were then inserted into the "TestField" template to replace the corresponding placeholders in the logical field template 346, whereby the "PK RBC-cCnc" field $308_6$ was generated. Once generated and stored in the database abstraction model 148, logical field definition $308_6$ can be used together with the field definitions $208_{1-5}$ (shown in FIG. 2B) to compose an abstract query.

Figure 3:
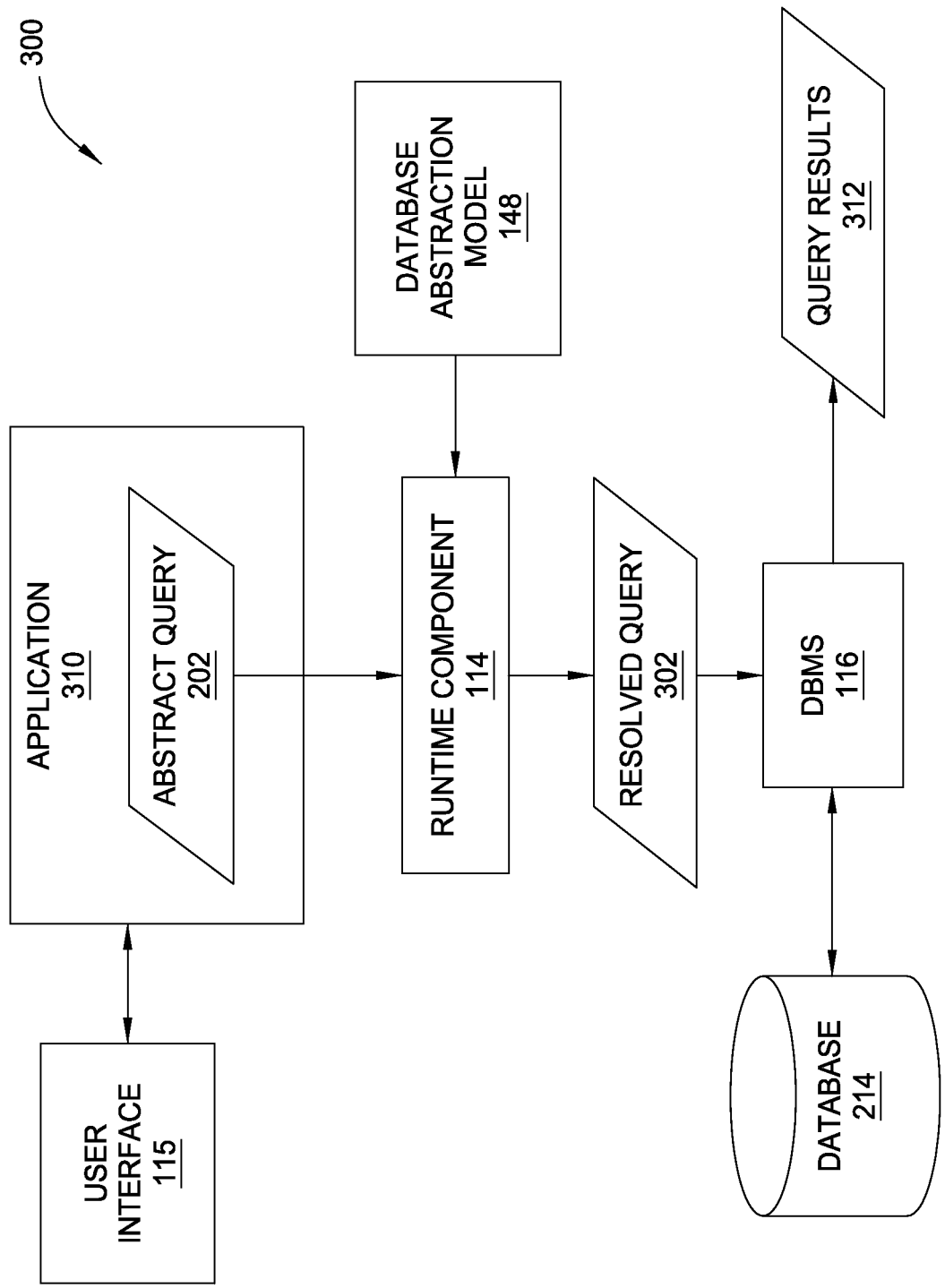
FIG. 3 illustrates a relational view of software components for executing an abstract query, according to one embodiment of the invention.

FIG. 3 illustrates a relational view 300 of software components for executing an abstract query, according to one embodiment of the invention. The software components of relational view 300 include user interface 115, application 310, runtime component 114, database management system (DBMS) 116, database 214, and database abstraction model 148.

As shown, the application 310 includes an abstract query 202. Illustratively, the abstract query 202 is created in the user interface 115, which in this example is a graphical user interface. However, it should be noted that the user interface 115 is only shown by way of example; any suitable requesting entity may create abstract query 202 (e.g., the application 310, an operating system, or an end user). Accordingly, all such implementations are broadly contemplated. As described above, the abstract query 202 may include query conditions for multiple compatible fields.

In one embodiment, the abstract query 202 is translated by the runtime component 114 into a resolved query 302. This translation is performed with the use of the database abstraction model 148, as described above with reference to FIGS. 2A-2B. The resolved query 302 is submitted to the DBMS 116 for execution against the database 214, thus producing a set of query results 312. The query results 312 may be presented to a user (i.e., in user interface 115), or may be used for further processing (e.g., as inputs for rule processing, etc.).

Figure 4:
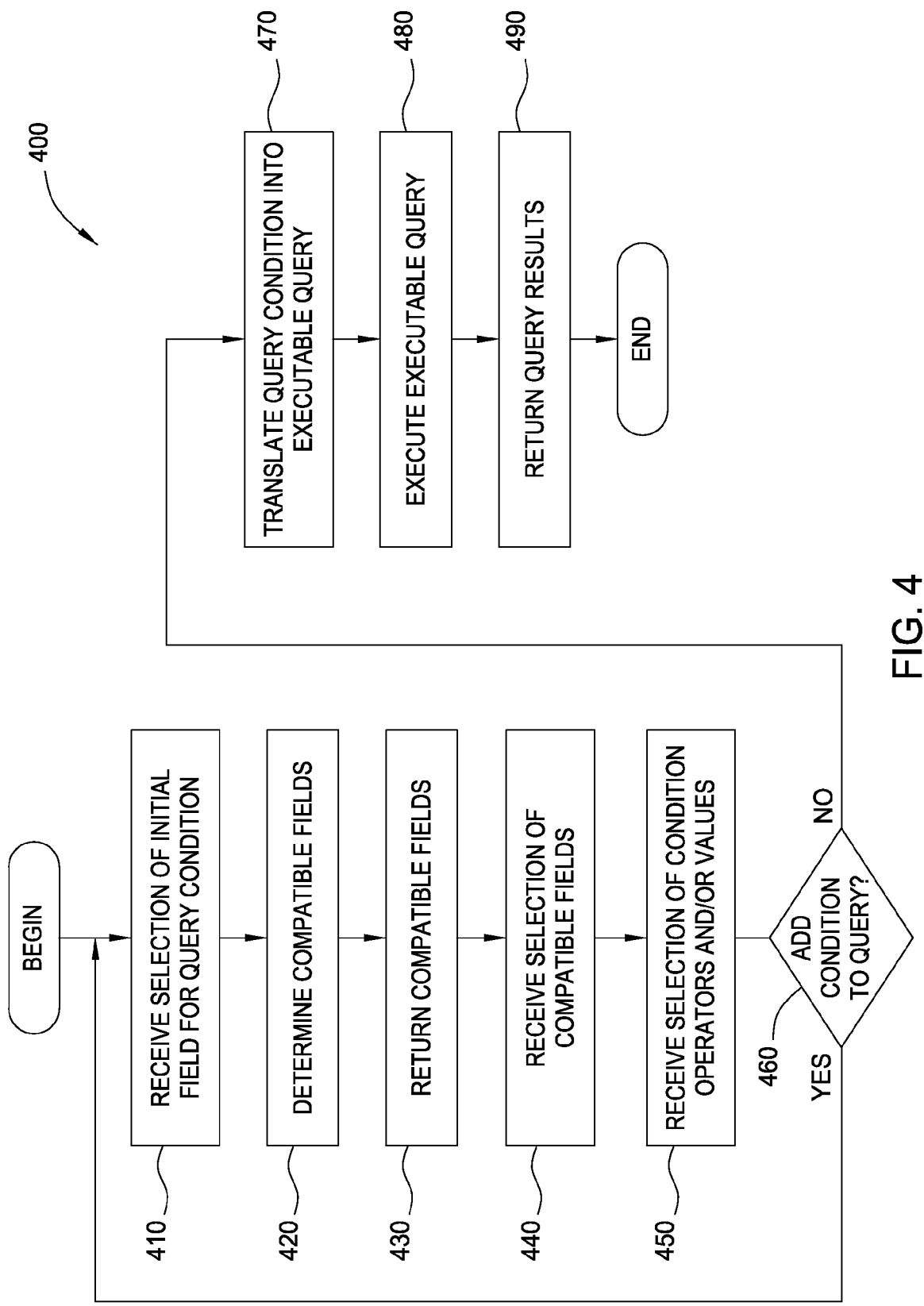
FIG. 4 illustrates a method for composing and executing abstract queries including multiple compatible fields, according to one embodiment of the invention.

FIG. 4 illustrates a method 400 for composing and executing abstract queries including multiple compatible fields, according to one embodiment of the invention. For the sake of illustration, the method 400 is described in conjunction with systems illustrated in FIGS. 1, 2A-2B, 3 and 6A-6C. Specifically, the steps of method 400 may be assumed to be performed by the runtime component 114 illustrated in FIG. 1. However, persons skilled in the art will understand that any system configured to perform the steps of the method 400, in any order, is within the scope of the present invention.

The method 400 begins at step 410 by receiving a selection of an initial logical field to be included in a query condition. In one embodiment, a user may select the initial logical field as part of composing a query condition to be included in an abstract query. Note that a single abstract query may include multiple query conditions. For example, referring to FIG. 6A, assume the user is interacting with the query interface 115, and the user has specified an initial logical field "X" 622 in the "QUERY FIELDS" section 620. Further, the user has specified additional data in the "QUERY CONDITIONS" section 610, namely a field alias "TEST" 612 (i.e., a name to be used in place of the logical field name), a logical operator "LESS THAN" 614, and a condition value "3.0" 161. Accordingly, the "QUERY" section 630 is displaying a query condition 632 as currently specified. Note that the "QUERY FIELDS" section 620 includes a control 624 labeled "SELECT ADDITIONAL FIELDS." For the purpose of illustration, assume that the user selects the control 624 in order to add additional fields that are compatible with the initial logical field "X" 622.

Referring again to FIG. 4, at step 420, fields that are compatible with the initial field are determined. For example, the runtime component 114 may analyze metadata included in the database abstraction model 148 to determine compatible fields. In one embodiment, compatible fields may be determined by identifying filtered fields based on the same columns of a physical database. This embodiment is discussed in greater detail below with reference to FIG. 5A. In another embodiment, compatible fields may be determined by identifying logical fields generated by a dynamic entity 225 using the same field template. This embodiment is discussed in greater detail below with reference to FIG. 5B.

At step 430, the compatible fields determined at step 420 may be returned. In one embodiment, a user may be presented with the compatible fields. For example, referring to FIG. 6B, the user interface 115 has been updated in response to the user selecting the control 624, and now includes a pop-up window 650. As shown, the pop-up window 650 includes several field names 652, representing the initial logical field "X" 622 as well as compatible logical fields. Note that field names 652 "X," "Y," and "Z" are shown with checked selection boxes 654, indicating that the user has selected the additional fields "Y" and "Z" to be included in the abstract query. Accordingly, the query condition 632 has been updated to reflect the additional fields.

Referring again to FIG. 4, at step 440, any compatible fields selected to be included in the abstract query may be received. At step 450, any logical operators and/or values to be included in the query condition may be received. For example, referring to FIG. 6B, the user may select the "DONE" button 656, and may then select the "EXECUTE QUERY" button 640. Accordingly, the runtime component 114 may receive the logical operator "LESS THAN", the condition value "3.0," as well as the fields "X," "Y," and "Z," from the user interface 115.

Referring again to FIG. 4, at step 460, it is determined whether another query condition will be added to the abstract query. If so, then the method 400 repeats at step 410, where another query condition is specified. However, if no additional query conditions are to be added to the abstract query, or if all required query conditions have been added to the abstract query, the method 400 continues at step 470, where the abstract query (specified in steps 410-460) is translated into an executable query. For example, the runtime component 114 may access the logical fields and conditions specified in the abstract query, along with the definitions for the logical fields and access methods included in the database abstraction model 148, and from this data, may generate a resolved query of the underlying database. In one embodiment, the runtime component 114 may compose the executable query such that query conditions including multiple compatible fields are translated into a single sub-query. That is, rather than translating each compatible field included in a condition into a separate executable sub-query, the compatible fields included in a condition may combined into a single executable sub-query. For example, assume a query condition requiring test data stored in the compatible fields X, Y, and Z. This query condition may be translated, e.g., using the IN operator of the SQL query language, as shown in the following example:

SELECT . . . WHERE TEST_NAME IN X, Y, Z

Note that, in the SQL query language, the IN operator serves to define a closed set of values for a corresponding field (in this case the "TEST_NAME" field).

At step 480, the executable query may be executed by a query engine (e.g., DBMS 116 shown in FIG. 1). At step 490, the query results may be returned (e.g., in user interface 115). For example, referring to FIG. 6C, the user interface 115 includes the query results 660, representing the results of executing the executable query at step 480. Note that the query results 660 include the "PATIENT" column 661, the "TEST" column 662, and the "VALUE" column 663, corresponding to the fields specified in the query condition 632 shown in FIG. 6B. Note also that the "VALUE" column 663 include values corresponding to multiple compatible fields, namely the fields X, Y, and Z. After step 490, the method 400 terminates.

FIG. 5A illustrates a method 500 for determining filtered fields compatible with an initial field included in a query condition, according to one embodiment of the invention. Specifically, the method 500 may be assumed to represent one embodiment of step 420 illustrated in FIG. 4, wherein the initial field (selected at step 410) is a filtered field. Further, the method 500 may be assumed to be performed by the runtime component 114 illustrated in FIG. 1. However, persons skilled in the art will understand that any system configured to perform the steps of the method 500, in any order, is within the scope of the present invention.

The method 500 begins at step 510 by determining a name column used to generate the initial filtered field included in a query condition. In one embodiment, the name column may be a column of a physical database storing the name of the filtered field (e.g., the Name Column value "Test_ID" included in logical field specification $208_3$ shown in FIG. 2B). At step 520, a value column used to generate the initial filtered field may be determined. In one embodiment, the value column may be a column of a physical database storing values of the filtered field (e.g., the Value Column value "Test_Results" included in logical field specification $208_3$).

At step 530, other filtered fields generated with the name column determined at step 510 and with the value column determined at step 520 may be identified as compatible fields. For example, referring to FIG. 2B, assume the filtered field $210_3$ named "Hemoglobin_Test" is the initial field specified for a query condition. Note that, as shown in FIG. 2B, the filtered field $210_5$ named "Hemoglobin_Test_2" has the same name column and value column as the filtered field $210_3$ named "Hemoglobin_Test." Thus, in this example, the filtered field $210_5$ named "Hemoglobin_Test_2" may be identified at step 530. After identifying filtered fields compatible with the initial filtered field at step 530, the method 500 terminates.

Figure 5B:
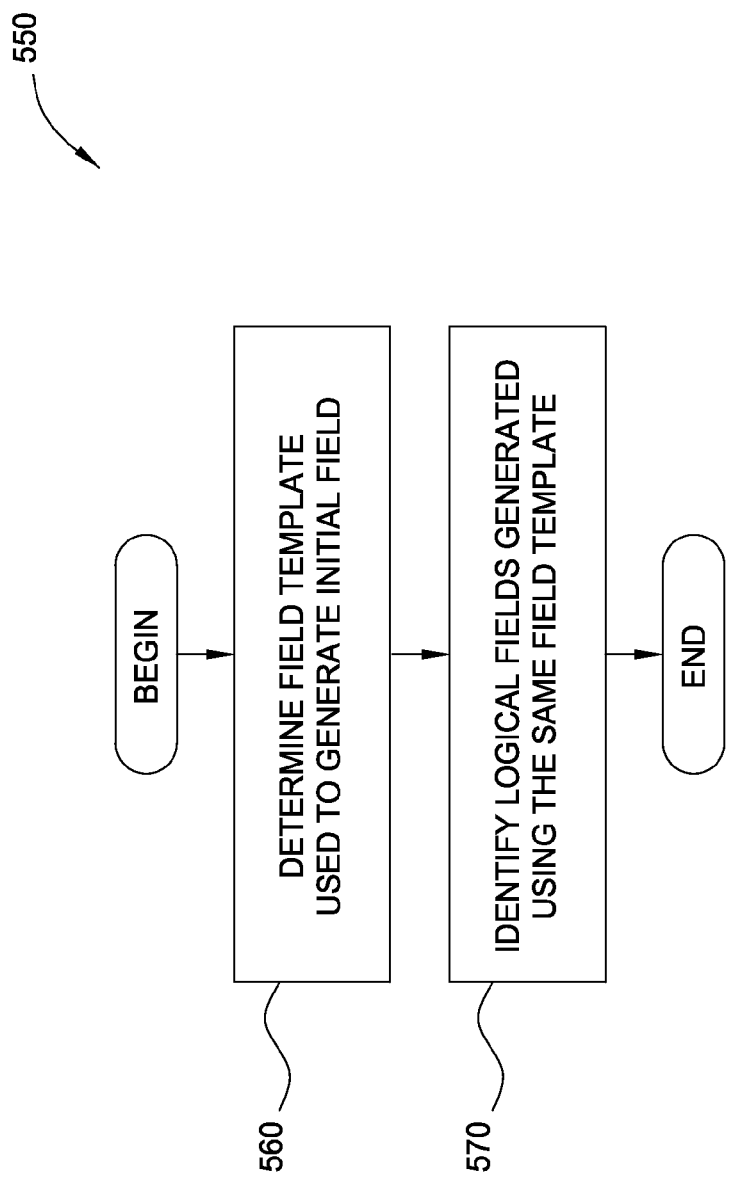
Figure 6A:
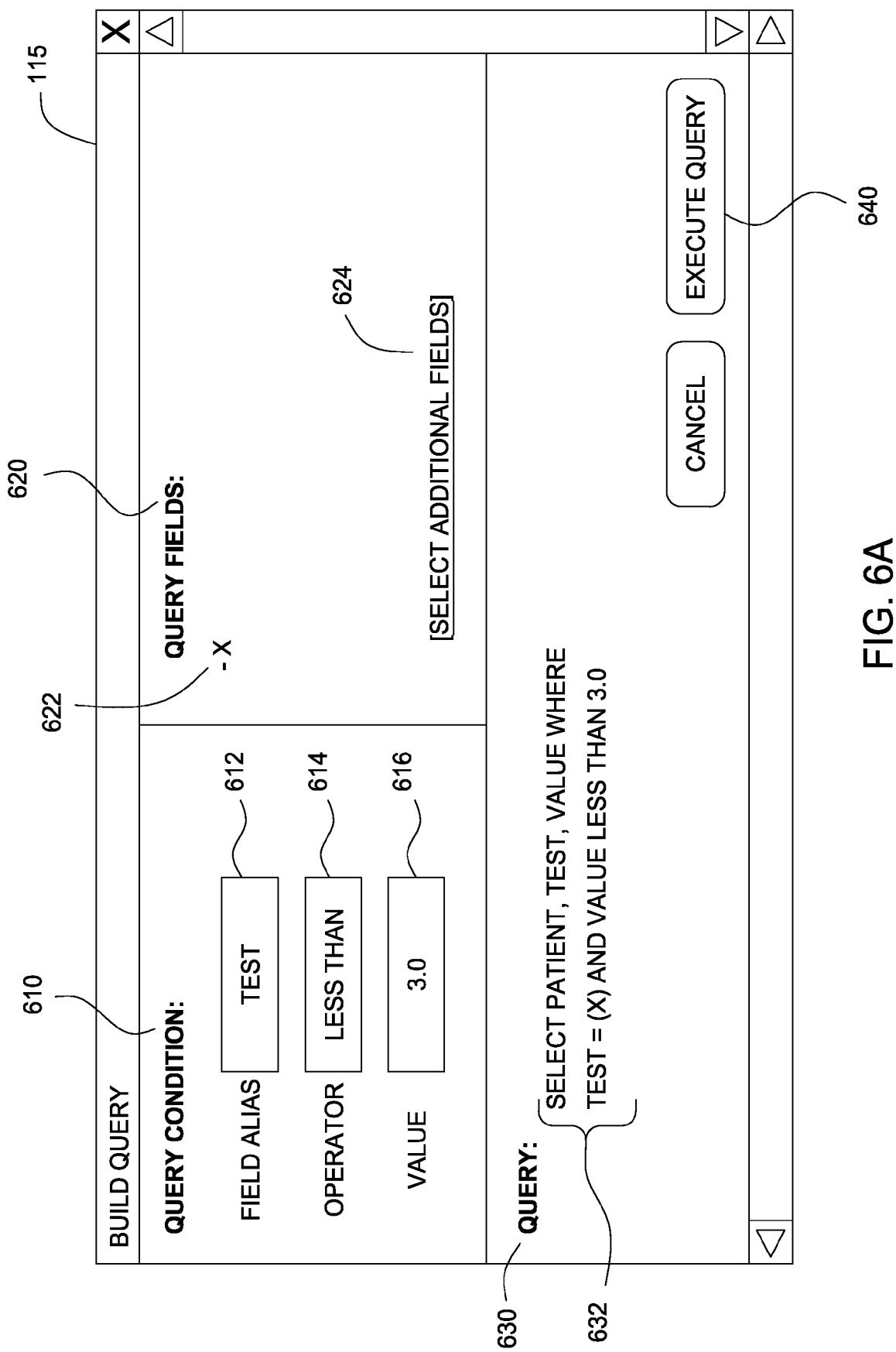
Figure 6B:
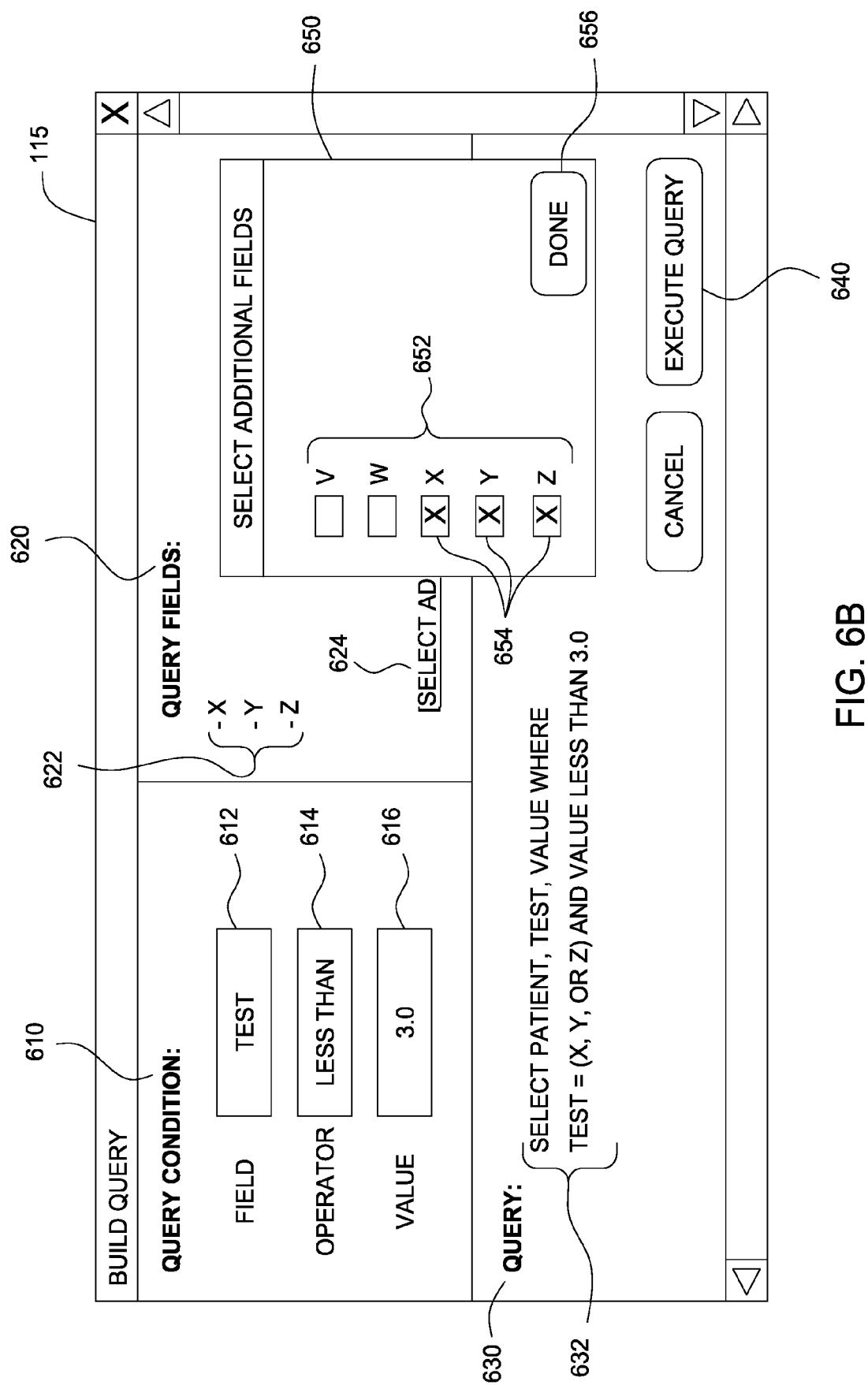

FIG. 5B illustrates a method 550 for determining filtered fields compatible with an initial field included in a query condition, according to one embodiment of the invention. Specifically, the method 550 may be assumed to represent one embodiment of step 420 illustrated in FIG. 4, wherein the initial field (selected at step 410) is a logical field generated by a dynamic entity (e.g., dynamic entity 225 shown in FIG. 2A). Further, the method 550 may be assumed to be performed by the runtime component 114 illustrated in FIG. 1. However, persons skilled in the art will understand that any system configured to perform the steps of the method 550, in any order, is within the scope of the present invention.

The method 550 begins at step 560 by determining a field template used to generate the initial field included in a query condition. In one embodiment, the field template may be specified in a dynamic entity definition. For example, assume the initial field is the "PK RBC-cCnc" field $308_6$ shown in FIG. 2C. Thus, in this example, the initial field is determined to be generated using the field template 346 named "TestField".

At step 570, other logical fields generated with the field template determined at step 560 may be identified as compatible fields. For example, referring to FIG. 2C, the runtime component 114 may identify other logical fields also generated using the field template 346 named "TestField". In one embodiment, the logical fields identified at step 570 are determined to be compatible with the initial field. After step 570, the method 550 terminates.

While the foregoing is directed to embodiments of the present invention, other and further embodiments of the invention may be devised without departing from the basic scope thereof, and the scope thereof is determined by the claims that follow.

What is claimed is:

1. A computer-implemented method, comprising:
providing an abstraction model defining a plurality of logical fields each having a respective access method specifying a technique for accessing underlying physical data, the access method selected from two or more distinct types of access methods, wherein the plurality of logical fields includes a plurality of filtered fields defined as having a filtered access method in the abstraction model, wherein the abstraction model includes, for each of the plurality of filtered fields, a filtered field definition specifying a respective: (i) field name that uniquely identifies the filtered field and is distinct from a corresponding field name in the underlying physical data, (ii) first column, (iii) second column and (iv) filter value, wherein each filtered field is configured to return a subset of values from the first column based on which values within the second column correspond to the filter value;

receiving an abstract query including an abstract query condition that specifies two or more filtered fields of the plurality of filtered fields;

determining that the two or more filtered fields are compatible fields, based on a determination that the filtered field definitions for the two or more filtered fields all reference a same first column and a same second column of the underlying physical data; and upon determining that the abstract query contains compatible fields:
generating an executable query from the abstract query by mapping fields from the abstract query to fields corresponding to values within the underlying physical data based on the abstraction model, wherein the abstract query condition specifying the two or more filtered fields is reflected in a single sub-query of the executable query; and executing the executable query to produce a set of query results.

2. The method of claim 1, wherein the abstraction model contains a plurality of logical fields, inclusive of the plurality of filtered fields, wherein a respective logical field definition for each of the plurality of logical fields in the abstraction model specifies a respective access method specifying manner of accessing one or more physical fields in the underlying physical data, the respective access method selected from two or more different types of access methods, and wherein at least one of the two or more different types of access methods is a filtered access method.

3. The method of claim 2, wherein the single sub-query is composed using the IN operator of the SQL query language.

4. The method of claim 1, further comprising presenting the set of query results to a user in a graphical user interface.

5. The method of claim 1, wherein values corresponding to the two or more filtered fields are returned in one column of the set of query results.

6. The method of claim 1, wherein determining that the two or more filtered fields are compatible fields further comprises retrieving metadata describing the plurality of logical fields.

7. The method of claim 1, wherein determining that the two or more filtered fields are compatible fields further comprises retrieving, from the abstraction model, logical field specifications specifying the plurality of logical fields.

8. A computer-readable storage medium including a program, which when executed on a processor performs an operation, the operation comprising:
providing an abstraction model defining a plurality of logical fields each having a respective access method specifying a technique for accessing underlying physical data, the access method selected from two or more distinct types of access methods, wherein the plurality of logical fields includes a plurality of filtered fields defined as having a filtered access method in the abstraction model, wherein the abstraction model includes, for each of the plurality of filtered fields, a filtered field definition specifying a respective: (i) field name that uniquely identifies the filtered field and is distinct from a corresponding field name in the underlying physical data, (ii) first column, (iii) second column and (iv) filter value, wherein each filtered field is configured to return a subset of values from the first column based on which values within the second column correspond to the filter value;

receiving an abstract query including an abstract query condition that specifies two or more filtered fields of the plurality of filtered fields;

determining that the two or more filtered fields are compatible fields, based on a determination that the filtered field definitions for the two or more filtered fields all reference a same first column and a same second column of the underlying physical data; and upon determining that the abstract query contains compatible fields:

generating an executable query from the abstract query by mapping fields from the abstract query to fields corresponding to values within the underlying physical data based on the abstraction model, wherein the abstract query condition specifying the two or more filtered fields is reflected in a single sub-query of the executable query; and executing the executable query to produce a set of query results.

9. The computer-readable storage medium of claim 8, wherein the executable query is composed using the SQL query language.

10. The computer-readable storage medium of claim 9, wherein the executable sub-query is composed using the IN operator of the SQL query language.

11. The computer-readable storage medium of claim 8, further comprising presenting the set of query results to a user in a graphical user interface.

12. The computer-readable storage medium of claim 8, wherein values corresponding to the two or more filtered fields are returned in one column of the set of query results.

13. The computer-readable storage medium of claim 8, wherein determining that the two or more filtered fields are compatible fields further comprises retrieving metadata describing the plurality of logical fields.

14. The computer-readable storage medium of claim 8, wherein determining that the two or more filtered fields are compatible fields further comprises retrieving, from the abstraction model, logical field specifications specifying the plurality of logical fields.

15. A system, comprising:
a processor; and
a memory containing a program, which when executed by the processor is configured to perform an operation, the operation comprising:

providing an abstraction model defining a plurality of logical fields each having a respective access method specifying a technique for accessing underlying physical data, the access method selected from two or more distinct types of access methods, wherein the plurality of logical fields includes a plurality of filtered fields defined as having a filtered access method in the abstraction model, wherein the abstraction model includes, for each of the plurality of filtered fields, a filtered field definition specifying a respective: (i) field name that uniquely identifies the filtered field and is distinct from a corresponding field name in the underlying physical data, (ii) first column, (iii) second column and (iv) filter value, wherein each filtered field is configured to return a subset of values from the first column based on which values within the second column correspond to the filter value;

receiving an abstract query including an abstract query condition that specifies two or more filtered fields of the plurality of filtered fields;

determining that the two or more filtered fields are compatible fields, based on a determination that the filtered field definitions for the two or more filtered fields all reference a same first column and a same second column of the underlying physical data; and upon determining that the abstract query contains compatible fields:

generating an executable query from the abstract query by mapping fields from the abstract query to fields corresponding to values within the underlying physical data based on the abstraction model, wherein the abstract query condition specifying the two or more filtered fields is reflected in a single sub-query of the executable query; and executing the executable query to produce a set of query results.

16. The system of claim 15, wherein the executable query is composed using the SQL query language.

17. The system of claim 16, wherein the executable sub-query is composed using the IN operator of the SQL query language.

18. The system of claim 15, further comprising presenting the set of query results to a user in a graphical user interface.

19. The system of claim 15, wherein values corresponding to the two or more filtered fields are returned in one column of the set of query results.

20. The system of claim 15, wherein determining that the two or more filtered fields are compatible fields further comprises retrieving, from the abstraction model, logical field specifications specifying the plurality of logical fields.

* * * * *